Nov. 14, 1961 W. G. HARVEY 3,008,189
INJECTION MOLDER
Filed May 5, 1959
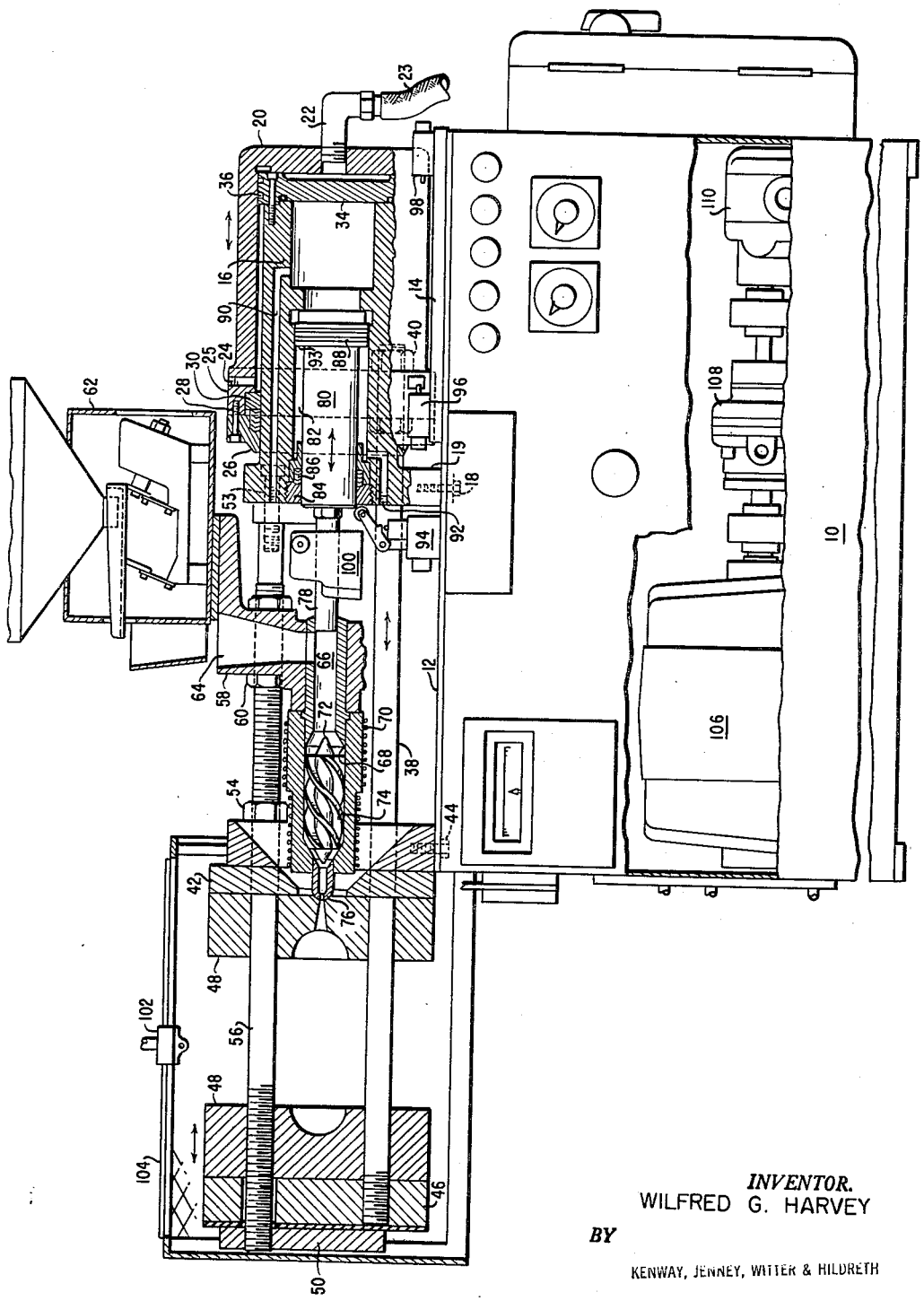
INVENTOR.
WILFRED G. HARVEY
BY
KENWAY, JENNEY, WITTER & HILDRETH
ATTORNEYS United States Patent Office 3,008,189
Patented Nov. 14, 1961

3,008,189
INJECTION MOLDER
Wilfred G. Harvey, 249 Abbott Ave., Leominster, Mass.
Filed May 5, 1959, Ser. No. 811,109
2 Claims. (Cl. 18—30)

This invention relates in general to injection molding machines and comprises particularly a new and improved machine for molding plastic articles.

Injection molding in the field of plastics involves a process in which raw plastic material, generally granular in appearance, is melted, forced into a mold where it is shaped, cooled and extracted. This process is usually carried out by injection molding machines.

An injection machine consists generally of two basic elements. First, the injection cylinder which serves to heat thermoplastic molding material to a plasticized state and force or inject it with relatively high pressure through a nozzle into a mold; and second the mold clamp which serves to clamp a two-part mold in closed condition and also to open it and eject the molded article, and to reclose the mold.

In a basic machine the injection end consists of an injection cylinder with a torpedo or spreader, as it is sometimes known, mounted in a fixed position in the delivery end of the cylinder; an injection piston mounted in the feed end of the cylinder; a material hopper, and an adjustable material feeder device. The injection piston is operated by a separate hydraulic cylinder. Electrical resistant units, either spirally or as a sleeve wrapped around the outside of the injection cylinder, serve to deliver the required heat. In some cases the torpedo or spreader is also equipped with electrical heating elements.

The feeder device delivers a predetermined amount of granular thermoplastic molding compound to the feed end of the injection cylinder, where it is forced towards the delivery end by the injection piston. As the solid cylindrical mass of molding compound is forced from the feed end towards the delivery end, it is broken up into many comparatively small sections by the spreader. The purpose of the spreader is to cause the thick mass of granular material to separate and flow through a multiplicity of small channels or thin sections, thereby permitting the delivery of uniform heat to all portions of each charge. The action of this spreader also causes the material to become uniformly plasticized in a much shorter period of time than would be otherwise possible, and without causing certain outer sections of it to be subjected to too high a heat, which might cause material degration.

The clamp end of the machine may take a variety of forms, but usually the opening and closing of the mold, as well as the application of full clamp pressure are accomplished by hydraulic means. A suitable hydraulic cylinder and piston, securely mounted to the machine, perform these functions.

On the whole, injection molding machines now on the market are somewhat massive and take up a good deal of floor space. The large size of these machines is required mostly by the two separate hydraulic units which have been described as actuating the mold clamp and the injection piston. The rather long spreader and heating chamber also add to the size of the machine. Because of the tremendous pressures and strains built up by the hydraulic mechanism, the framework of the machine must be extremely massive and sturdy to bear up under continuous operation.

In addition to the large size of these machines their molds are relatively inaccessible and cannot be easily changed without disturbing the machine frame, cylinders and basic components. These factors limit the number of machines that can be set up in a given area and make it difficult to arrange an efficient assembly line.

It is an object of this invention to provide a compact injection molding machine that is inexpensive to manufacture yet completely efficient and extremely durable.

Another object of this invention is to provide an injection molding machine in which the molds are readily accessible for changeover.

Yet another object is to provide an injection molding machine that is ideally suited for assembly line production.

One feature of this invention involves incorporating the hydraulic clamp cylinder and injection cylinder into a single unit on one end of the machine. This arrangement materially reduces the size and weight of the machine and centralizes all the hydraulic components. Besides this it makes it possible to extend the clamp and molds out over one side of the machine in a cantilever fashion. This cantilever design may be noted as another feature of this invention and permits conveyor belts, receiving drums and the like to be brought directly under the molding portion so that the molded product may be discharged directly to the conveyor.

Still another feature of the invention resides in the torpedo or spreader which is provided with a number of fins mounted spirally about its periphery. This spiral configuration shortens both the spreader and the heating cylinder considerably, yet is as effective as a heating cylinder twice as long.

Yet another feature of this invention concerns four tie rods, two in tension between the mold of the clamp cylinder and two in compression between the mold and a stationary cylinder standard, using all the clamp pressure to molding advantage and eliminating wasted strain on the machine frame.

Other specific objects, features and advantages will be readily understood from the description which follows, taken in connection with the accompanying drawing which is a view in side elevation, partly in section, of an injection molding machine embodying my invention.

Referring now to the drawing, the reference character 10 generally indicates a steel base cabinet complete with control instruments, indicators and the like. The cabinet top is fabricated of a heavy gauge steel sheet in the form of a table 12 for the support of the molding machine proper. At the right hand side of the table 12, as viewed in the drawings, there are fastened ways 14 provided in a generally flat metal plate positioned beneath the overhang of the hydraulic mechanism of the machine.

Constituting a primary element in the hydraulic mechanism is a stationary cylinder standard 16, generally cylindrical in contour and firmly fastened to the central portion of the table 12 by means of stout bolts 18 engaging with a collar 19 formed about one end of the standard 16. Slidably mounted upon the outside of the standard 16 is a clamp cylinder 20 provided with a suitable hydraulic pressure connection 22 and flexible hydraulic line 23. A return hydraulic connector 24 is made at the side of the clamp cylinder 24 adjacent a stuffing box 25. A gland 26 is fastened to the stuffing box 25 by means of bolts 28 spaced about its periphery. The gland serves to compress several rings of packing 30 against the stuffing box and the cylinder standard to prevent leakage of hydraulic fluid. Enclosing the inner end of the cylinder standard 16 is a circular plate 34 provided with a number of compression rings 36 serving to separate the pressure side of the clamp cylinder from the return side.

Extending longitudinally from the clamp cylinder 20 is a pair of lower tension rods 38 held in engagement with the clamp cylinder by nuts 40. These tension rods pass through a fixed platen 42 and connect with a movable platen 46. The fixed platen 42 is securely fastened to the table 12 and cabinet 10 by means of bolts 44. Mounted in opposite alignment to one another on the fixed and movable platens are a pair of mold halves 48.

It will be obvious now that if hydraulic fluid is pumped under pressure into the clamp cylinder 20 through the connector 22, the clamp cylinder 20 will be thereby moved to the right. The cylinder standard 16 remains stationary at all times. The right hand movement of the clamp cylinder 20 pulls the tension rods 38 as well as the movable platen 46 to right, thereby closing the mold halves 48 and setting the stage for an injection of plasticized material into the mold cavity.

Extending parallel to and above the tension rods 38 is a pair of compression rods 56 which counteract and balance the pressure of the clamp cylinder 20 and its tension rods 38. This counteraction of pressures is made possible by securing one end of each compression rod 56 to the cylinder standard 16 by means of bolts 53 and fastening the fixed platen 42 to the same rods by means of nuts 54. An ejector bar 50 is held firmly in place on the outer end of the compression rods. In practice it may be desirable to mount a compression rod adjacent a tension rod so that like rods are diagonally opposite to one another. This will give a more even distribution of load.

By this arrangement all the strain built up by the closing of the molds is taken up by the compression rods 56, with none of it being transferred to the base cabinet 10. The compression rods 56 also support a feed bracket 58 held in place along the compression rods by means of nuts 60. The feed bracket in turn supports a vibratory feeding device 62. The purpose of the vibratory feeding device is to discharge a measured amount of granular plastic material down a funnel 64 into a feed cylinder 66. The feed cylinder interconnects with a heating chamber 68 which has an inside diameter somewhat larger than that of the feed cylinder. Resistance windings 70 are wrapped about the outer surface of the heating chamber in the normal manner.

Mounted within the heating chamber 68 is a novel spreader or torpedo 72 as it is sometimes known. The spreader is formed with a number of spaced helical flutes 74 forming several spiral passages about the central portion of the spreader. At the terminal of the heating chamber 68 is formed a nozzle 76 interconnecting with the cavities of the mold 48. In operation, a solid, comparatively thick mass of molding compound is forced from the feed cylinder 66 into the heating chamber 68 where it is broken up into several comparatively small sections by the spreader 72. The spreader is in heat-conductive contact with the heated walls of the heating chamber 68 so that the spreader itself is heated. By forcing the feed material to pass through the spiral channels, the heat is more easily and more uniformly delivered to the material and accelerates the plasticizing of the granules. The spiral passages encourage a much better compacting of the material and discourages the formation of air pockets. Also the spiral configuration produces a more rapid transfer of heat than can be achieved with a spreader having axially straight passages. Obviously, the spreader may be made much shorter than the conventional type of spreader, and makes possible a substantial reduction in the overall length of the molding machine.

The feed material, which has been mentioned above, is forced from the feed cylinder 66, through the heating chamber 68 out of the nozzle 76 and into the mold 48 by means of an injection ram 78, mounted to reciprocate within the feed cylinder. The ram 78 is coupled to a hydraulic ram piston 80 mounted for reciprocation in a ram cylinder 82 formed in the cylinder standard 16 and co-axial with the clamp cylinder 20. A gland nut 84 holds several rings of packing 86 under compression about the ram piston 80 to prevent leakage of hydraulic fluid. An enlarged piston head 88 is provided with several compression rings and separates the pressure sides of the ram cylinder from the return side.

To produce a pressure stroke of the ram piston 80, and of course the ram 78, hydraulic fluid is pumped under pressure through a passage 90 formed in the cylinder standard 16. A return stroke is made by releasing the pressure mentioned above, and introducing hydraulic fluid under pressure into a return passage 92. This return passage connects with the ram cylinder at a point near the gland nut 84. Fluid entering the ram cylinder from this passage will push against a shoulder 93 formed on the piston, forcing the piston to move to the right and return to its normal retracted position.

In a normal cycle of the machine, the sequence of operation would be as follows; assuming a charge of granular, thermoplastic material has been deposited in the feed cylinder 66, a hydraulic control system (not shown) will cause hydraulic fluid to be pumped through the connector 22. This will move the clamp cylinder to the right, along with the tension rods 38 and the movable platen 46, bringing the mold halves 48 together. When the mold is completely closed a clamp switch 98, mounted on the ways 14, is closed. This will actuate a hydraulic valve which will direct hydraulic fluid through the passage 90, causing the piston ram 80, together with the injection ram 78, to move to the left. The granular plastic is thereby forced from the feed cylinder 66 into the heating chamber 68 and about the spreader 72, where it becomes progressively plasticized until it turns into a melt. From there it passes out of the nozzle 76 into the mold 48. A ram limit switch 94 is responsive to the position of the ram and along with a feed controlling device 100 controls the operation of the vibratory feeding device when the ram is fully retracted. A timer (not shown) is in control of the opening and closing of various circuits to insure proper cycling of the machine. When sufficient time elapses, pressure is released on the clamp cylinder 20 and it is moved to the left, at the same time opening the molds 48. When the clamp cylinder is fully returned a clamp open limit switch 96 is tripped, opening an air valve and sending an air blast through a nozzle 102 to remove the molded parts from between the mold faces. This air nozzle 102 is mounted on a safety cage 104 encircling the molding portion of the machine and may be moved along the cage to align with the mold faces. A motor 106 is mounted in the base cabinet 10 to drive a high pressure hydraulic pump 108 and a high volume hydraulic pump 110. Both of these pumps are preferably of the positive displacement type and connect with the hydraulic mechanism in the molder through various lines and valves (not shown). Other auxiliary machinery and equipment such as a heat exchanger, a control pyrometer, manifolds and so forth, may also be contained in the cabinet 10. The entire machine comes as a complete, compact unit, and is entirely self-contained save for electrical power.

By combining the injection ram and clamp cylinder in one cylinder standard the overall size of the machine is reduced almost to half of that of conventional machines. A further reduction in size is made possible by the use of the spiral spreader. With the hydraulic mechanism arranged on one side of the machine the clamping and molding sections are able to extent out over the side of the base cabinet 10 in a cantilever fashion. This allows receiving drums, separating chutes or vibrating screens to be placed directly below the molding position. It also allows a battery of machines to serve one common conveyor belt. In addition to this the cantilever design places the platens and molds in a very accessible position so that the molds can be easily and quickly changed without interfering with other parts of the machine. The tension and compression tie rods insure that all pressure put out by the hydraulic mechanism is utilized in the molding operation with none of it being transferred to the base cabinet. The advantage to this is a much more efficient use of the materials and power on hand. The cabinet may be built much lighter than usual since there is no wasted strain placed on it during operation of the machine.

While I have shown and described one desirable embodiment of the invention it is to be understood that this disclosure is for the purpose of illustration and that various changes and modifications may be made without departing from the spirit and scope of the invention as set forth in the appended claims.

I claim:

1. An injection molding machine, comprising a base, a cylindrical standard secured to said base, a fixed platen secured to said base and spaced from said standard, a hydraulically operated clamp cylinder having an axial recess formed therein, said cylinder being concentrically mounted over one end of said standard and adapted for axial reciprocation relative thereto, said standard constituting a stationary piston for said cylinder, tension rods coupled at one end to said clamp cylinder and extending through said fixed platen, a movable platen coupled to the other end of said rods, reciprocation of said clamp cylinder being operative to move said movable platen to or away from said fixed platen, a two-part mold mounted between said platens, a housing mounted on said base between said standard and said platens and having a cylindrical feed chamber formed therein, said standard being formed at its opposite end with an axial recess, and a charge-feeding ram mounted for reciprocation in said recess and extending into said feed chamber, said clamp cylinder having a greater effective pressure area transverse to the axis of reciprocation thereof than that of said ram, reciprocation of said ram being operative to force a charge of material out of said feed chamber and into said mold.

2. An injection molding machine, comprising a base, a cylindrical standard secured to said base, a fixed platen secured to said base and spaced from said standard, a hydraulically operated clamp cylinder having an axial recess formed therein, said cylinder being concentrically mounted over one end of said standard and adapted for axial reciprocation relative thereto, tension rods coupled at one end to said clamp cylinder, a movable platen coupled to the other end of said rods, reciprocation of said clamp cylinder being operative to move said movable platen to or away from said fixed platen, a two-part mold mounted between said platens, a housing mounted on said base between said standard and said platens and having a cylindrical feed chamber formed therein, said standard being formed at its opposite end with an axial recess, and a charge-feeding ram mounted for reciprocation in said recess and extending into said feed chamber, said clamp cylinder having a greater internal projected area than the projected area of said ram transverse to the respective axes of reciprocation thereof, reciprocation of said ram being operative to force a charge of material out of said feed chamber and into said mold.

References Cited in the file of this patent

UNITED STATES PATENTS

| | | |
|---|---|---|
| 1,952,241 | Eckert | Mar. 27, 1934 |
| 2,120,943 | Schutz | June 14, 1938 |
| 2,669,750 | Keeney | Feb. 23, 1954 |
| 2,698,460 | Amo | Jan. 4, 1955 |

FOREIGN PATENTS

| | | |
|---|---|---|
| 929,239 | France | Dec. 19, 1947 |
| 731,723 | Germany | Feb. 13, 1943 |